(12) United States Patent
Doerr et al.

(10) Patent No.: US 9,134,698 B2
(45) Date of Patent: Sep. 15, 2015

(54) THREE DIMENSIONAL DISPLAY COMPUTE SYSTEM

(75) Inventors: Michael B. Doerr, Dripping Springs, TX (US); Jan D. Garmany, Austin, TX (US); Michael B. Solka, Austin, TX (US); Martin A. Hunt, Austin, TX (US)

(73) Assignee: Coherent Logix, Incorporated, Austin, TX (US)

( * ) Notice: Subject to any disclaimer, the term of this patent is extended or adjusted under 35 U.S.C. 154(b) by 525 days.

(21) Appl. No.: 13/590,086

(22) Filed: Aug. 20, 2012

(65) Prior Publication Data

US 2013/0044105 A1 Feb. 21, 2013

Related U.S. Application Data

(60) Provisional application No. 61/525,579, filed on Aug. 19, 2011.

(51) Int. Cl.
*G06T 15/00* (2011.01)
*G03H 1/08* (2006.01)
*G03H 1/04* (2006.01)

(52) U.S. Cl.
CPC ..... *G03H 1/0808* (2013.01); *G03H 2001/0421* (2013.01); *G03H 2001/0858* (2013.01); *G03H 2210/30* (2013.01); *G03H 2210/441* (2013.01); *G03H 2226/02* (2013.01)

(58) Field of Classification Search
CPC ......... G03H 1/26; G03H 1/08; G03H 1/2294; G06T 19/00; G06T 17/20; G06T 7/0075

USPC ............. 345/419; 382/154; 348/40; 356/300; 359/9

See application file for complete search history.

(56) References Cited

U.S. PATENT DOCUMENTS

| 7,151,849 B1 | 12/2006 | Camahort et al. |
| 2010/0253677 A1* | 10/2010 | Kroll et al. .................. 345/419 |
| 2011/0007375 A1* | 1/2011 | Klug et al. ...................... 359/23 |
| 2011/0012895 A1 | 1/2011 | Lucente et al. |
| 2011/0199658 A1 | 8/2011 | Blanche et al. |

OTHER PUBLICATIONS

Plesniak et al.; Reconfigurable Image Projection Holograms; Optical Engineering 4S(11), 115801; Nov. 29, 2006; pp. 115801-1 through 115801-15.

\* cited by examiner

*Primary Examiner* — Jefferey Harold
*Assistant Examiner* — Omer Khalid
(74) *Attorney, Agent, or Firm* — Meyertons Hood Kivlin Kowert & Goetzel, P.C.; Jeffrey C. Hood; Mark S. Williams

(57) ABSTRACT

System and method for video holographic display. Information is received regarding a 2D hogel array with multiple hogel apertures, specifying number, size, and/or spacing of the hogel apertures. Information regarding a 3D scene is received, including a scaling factor mapping the 3D scene to a 3D display volume. Due to gradual variation of radiation patterns from hogel to hogel, a full set of color radiation intensity patterns for the entire hogel array may be generated by interpolating the color radiation intensity patterns from a sparse subset of the hogels without having to compute all of the patterns. The full set of color radiation intensity patterns may then be used to holographically display the 3D scene.

4 Claims, 3 Drawing Sheets

THREE DIMENSIONAL DISPLAY COMPUTE SYSTEM

PRIORITY INFORMATION

This application claims benefit of priority of U.S. Provisional Application Ser. No. 61/525,579 titled "Three Dimensional Display Compute System", filed Aug. 19, 2011, whose inventors were Michael B. Doerr, Jan D. Garmany, Michael B. Solka, and Martin A. Hunt, which is hereby incorporated by reference in its entirety as though fully and completely set forth herein.

FIELD OF THE INVENTION

The present invention relates generally to three dimensional (3D) graphics display, and more specifically, to video holographic display of dynamic 3D scenes.

DESCRIPTION OF THE RELATED ART

In video holography systems, views of a rendered graphics object are presented in such a way that a viewer perceives a fully three-dimensional (3D) object with full parallax view of the object, i.e., as the viewer moves his head, the image presented to his eyes changes even though the rendered object does not. One way this is achieved is via a grid or array of holographic elements, referred to as "hogels", which operate as view angle dependent pin-hole views of the rendered object. The entirety of the light projected from the screen is called a 4D wavefield, also known as a lightfield. The "4D" aspect is due to the 2D hogel array, and the 2D angular dispersion or dependence of light from each hogel. Each hogel emits light in a solid angle, referred to as a view angle, and the radiation emitted from the hogel is described in terms of discrete beams uniformly distributed through the solid angle. The small solid angle subtended by each constituent beam is termed an "anglet", and may be computed by dividing the total solid angle by the number of anglets in the radiation pattern. In an informal use, anglet may also be used to refer to the beam direction.

To arrive at the radiation pattern from each hogel necessary for the specification of the entire 4D wavefield, it is necessary to derive the radiation pattern from the rendered scene or to calculate the wavefield directly from the contributions of the individual facets in the scene. In a brute force approach to the 4D rendering, a 2D rendering of a perspective view is required for each hogel, which defines the POV of the rendering.

As observed in Error! Reference source not found.1, to implement the system using a brute force computation approach is unrealistic. To achieve a realizable solution would require roughly a 20,000× improvement in capability by Nvidia, a 10,000× improvement by AMD, and 1,400× improvement by Coherent Logix.

Improved methods and mechanisms for three dimensional graphics display are desired.

SUMMARY OF THE INVENTION

Various embodiments of a system and method for video holographic display of dynamic 3D scenes are presented.

Information regarding a two dimensional (2D) hogel array (i.e., an array of hogels) that includes a plurality of hogel apertures may be received. The information regarding the 2D hogel array may specify number, size, and/or spacing of the hogel apertures. Information regarding a 3D scene to be rendered, including a scaling factor that maps the 3D scene to a 3D display volume, may also be received. For each hogel of a sparse subset of the hogels in the 2D hogel array, a 2D perspective rendering of the 3D scene from the point of view (POV) of the hogel of the sparse subset, and a color radiation intensity pattern may be generated based on the 2D perspective rendering. For each hogel of a complementary subset of the hogels with respect to the sparse subset the color radiation intensity patterns of three or more hogels of the sparse subset in a neighborhood of the hogel may be generated, thereby generating an interpolated color radiation intensity pattern for the hogel of the complementary subset.

A full set of color radiation intensity patterns for the 2D hogel array may be generated based on the color radiation intensity patterns of the sparse subset of hogels and the interpolated color radiation intensity patterns for the complementary subset of the hogels. The full set of color radiation intensity patterns for the 2D hogel array may be stored. The full set of color radiation intensity patterns for the 2D hogel array may be useable to render a holographic view of the 3D scene. Moreover, the above method elements may be repeated one or more times in an iterative manner to dynamically render a sequence of such scenes, e.g., to present a holographic video, e.g., in real time.

In some embodiments, the 2D hogel array may be defined on a surface, e.g., a curved, possibly complex, surface, and the information regarding the 2D hogel array may further specify the surface. The method may thus take the shape of the 2D hogel array into account in implementing the techniques disclosed herein.

TABLE 1

Brute force approach to hogel rendering at 30 frames per second - hardware architecture comparison by display size

| Display Size | | based on Nvidia GF110 in GeForce GTX 580 | | based on AMD Cayman in Radeon HD 6970 | | based on CLX hx3100a in hxHADS | |
|---|---|---|---|---|---|---|---|
| (hogels) (approximate) | op/sec at 30 fps | # of Nvidia GF110's | W | # of AMD Cayman's | W | # of CLX hx3100a's | W |
| 144 | 1.4E12 | 4 | 1.4E3 | 2 | 604 | 18 | 87 |
| 2400 | 2.2E13 | 55 | 2.3E4 | 27 | 9.7E3 | 278 | 1.4E3 |
| 10,000 | 8.9E13 | 220 | 9.0E4 | 108 | 3.9E4 | 1.1E3 | 5.6E3 |
| 600,000 | 5.7E15 | 1.4E3 | 5.8E6 | 6.9E3 | 2.5E6 | 7.1E4 | 3.6E5 |

These and other features and advantages will become apparent to those of ordinary skill in the art in view of the following detailed descriptions of the approaches presented herein.

BRIEF DESCRIPTION OF THE DRAWINGS

A better understanding of the present invention can be obtained when the following detailed description is considered in conjunction with the following diagrams, in which.

Figure 1:
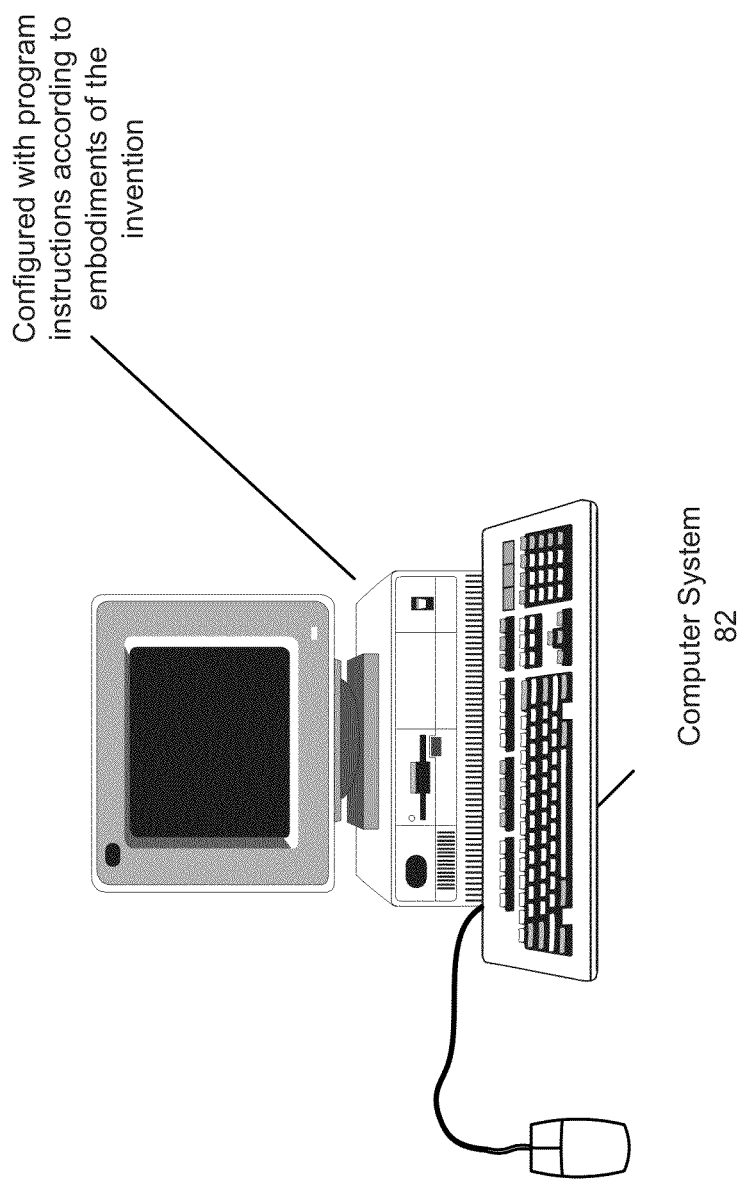
FIG. 1 illustrates a computer system configured to implement embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional Application Ser. No. 61/525,579 titled "Three Dimensional Display Compute System", filed Aug. 19, 2011.

FIG. 1—Computer System

FIG. 1 illustrates a computer system 82 configured to implement embodiments. As shown in FIG. 1, the computer system 82 may include a display device and at least one memory medium on which one or more computer programs or software components according to one embodiment of the present invention may be stored. For example, the memory medium may store one or more programs which are executable to perform the methods described herein. The memory medium may also store operating system software, as well as other software for operation of the computer system. Various embodiments further include receiving or storing instructions and/or data implemented in accordance with the foregoing description upon a carrier medium.

Reduction of Computing Requirements for Rendering a Video Holographic Dynamic 3D Scene The following describes various embodiments of systems and methods for video holographic rendering of a dynamic 3D scene. As noted above, using prior art techniques, the data volume and computing requirements associated with synthetic video holography rapidly become alarming with hogel array size, since in principle, a 3D rendering from the POV of each hogel must generally be performed, and the color radiation intensity patterns for each hogel must be derived from each rendering and retained for transmission to the holographic display. However, due to the usually slow variation of hogel radiation patterns between adjacent hogels, a substantial reduction in computation may be achieved.

For corresponding beams from adjacent hogels, the variation of intensities is gradual. This relationship is referred herein as "anglet correlation". To see the degree of expected anglet correlation in a 256×256 anglet array, one may begin with an estimate of the angular separation between the anglets. The solid angle subtended by a cone of half-angle $\theta$ is given by:

$$\Omega = 2\pi \int_0^\theta d\theta' \sin\theta' = 2\pi(1-\cos\theta) \qquad (1)$$

With a full viewing angle of 90 degrees, the solid angle is:

$$\Omega = 2\pi(1 - 1/\sqrt{2}) \sim 1.84. \qquad (2)$$

Distributing the solid angle over the $2^{16}$ anglets ($256^2$) and, using the approximation $\Delta\Omega \sim \pi\theta_0^2$ for small cones of half-angle $\theta_0$, $\theta_0 \sim 3$ milliradians, or 11 minutes of arc, is obtained. The center-to-center spacing of the sampling of the radiation pattern is then about 20 minutes, which is large compared with the angle subtended by the hogel separation at typical points on the rendered object. Due to the overlap between anglets from adjacent (or near) hogels, one may undersample the POV locations, e.g., the hogels, by a factor of 15 or more in each direction, leading to a commensurate reduction of the computational burden of 3D rendering by a factor of 225 (in this particular exemplary case). In general, for a stride of $\alpha$ through the hogel locations, the computation for rendering may be reduced by a factor of $1/\alpha^2$. Accordingly, the wavefields for the intervening hogels may be interpolated, which requires far less computational effort than rendering for every hogel POV.

The highly correlated behavior (i.e., gradual angular variation) from hogel to hogel may facilitate use of a large stride over the hogels to reduce computational demands to practical levels. The sampled dependence of the hogel radiation patterns may be interpolated to the hogels that were skipped. In some embodiments, this interpolation may actually require more computation than the rendering for the very sparse initial sampling.

Thus, in practice, one may exploit a high degree of correlation between radiation patterns from hogel to hogel to reduce the required resources to achievable levels.

Figure 2:
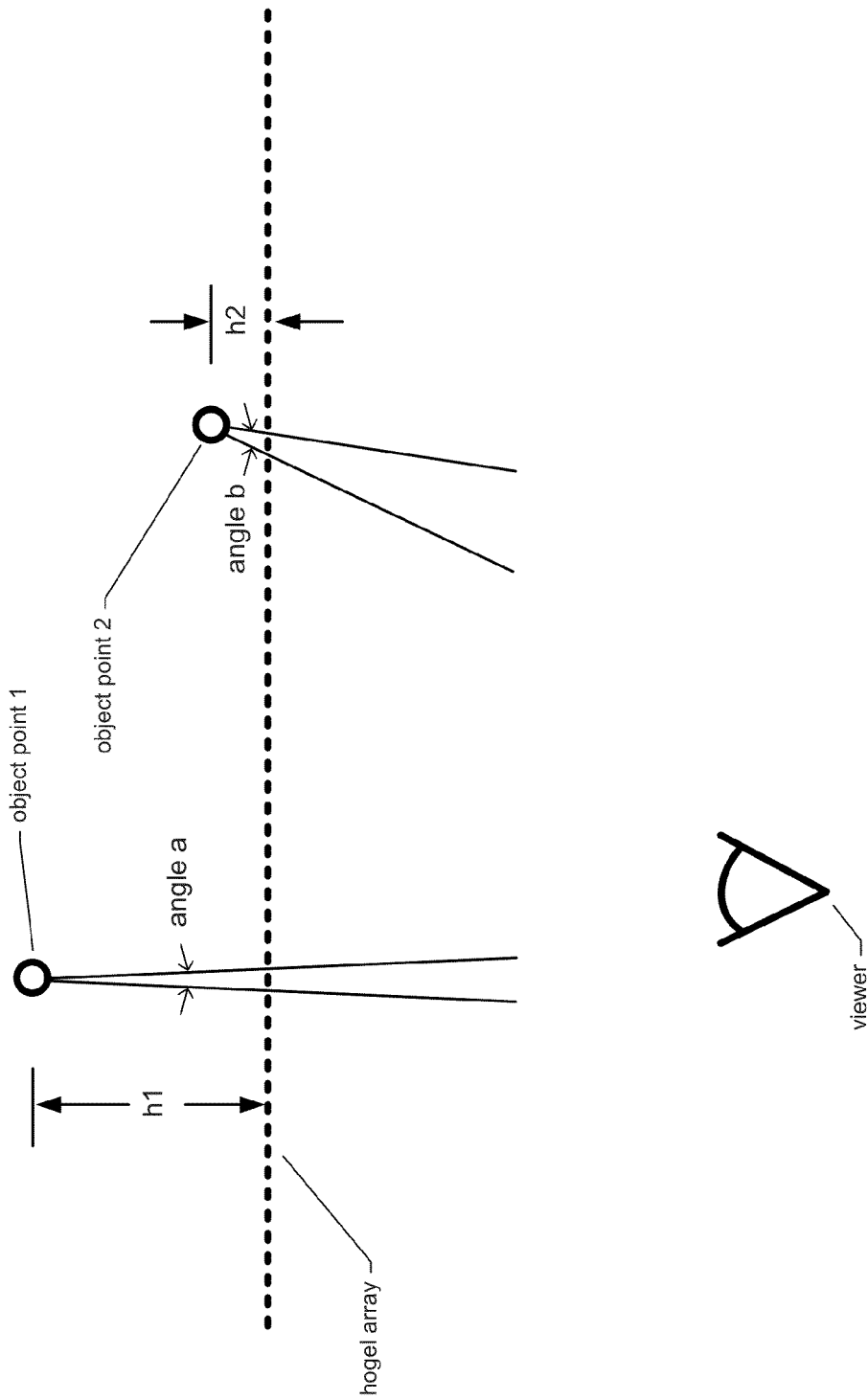
FIG. 2 illustrates dependence of rapidity of angular variation of radiation patterns from hogel to hogel on depth to a point on an object in a 3D scene.

FIG. 2: Dependence of Rapidity of Angular Variation of Radiation Patterns on Object Depth FIG. 2 illustrates dependence of rapidity of angular variation of radiation patterns from hogel to hogel on depth to a point on an object in a 3D scene. In this exemplary embodiment, two object points in a 3D scene, specifically, object point 1 and object point 2, are at different depths (distances from the hogel array (plane)), as shown by h1 and h2, respectively. As may be seen, the proximity of an object point to the hogel array (plane) determines the angular variation of emitted light through adjacent hogels, referred to as rapidity of angular variation of radiation patterns from hogel to hogel, and thus, for object point 1, at h1 from the hogel array plane, the difference between angles of emitted light between adjacent hogels, represented by angle a, is smaller than that of object point 2, at h2 from the hogel array plane, i.e., angle b.

Thus, for portions of the object that are very close to the hogel plane, the above degree of correlation of the radiation patterns no longer holds. The sampling of the hogel plane may be finer, even up to full resolution. However, for such hogels, the view frustum for the limited field of view may clip away all but the closest vertices, so the 3D rendering problem may be greatly reduced. It is expected that this reduction of complexity, referred herein as interpolation from correlation, by a factor varying from (approximately) 1 to 225 may, in part, make the development of video synthetic holographic displays practical. From the set of rendered scenes (which is far smaller in number than the total number of hogels), one may form suitable averages of scene intensities over elliptical or quadrilateral regions. The shape of the region may be determined by the chosen geometry of the angular sampling. For instance, a conical anglet view from the hogel may intersect the plane of the scene in an ellipse. The intensity formed by the average may be multiplied by the cosine of the angle made by the axis of the anglet view with the normal to the view plane. Alternatively, the angular radiation sampling may be made in terms of the contribution from each facet to each subsampled hogel directly, with averaging over the irregular sampling to achieve the desired resolution.

Figure 3:
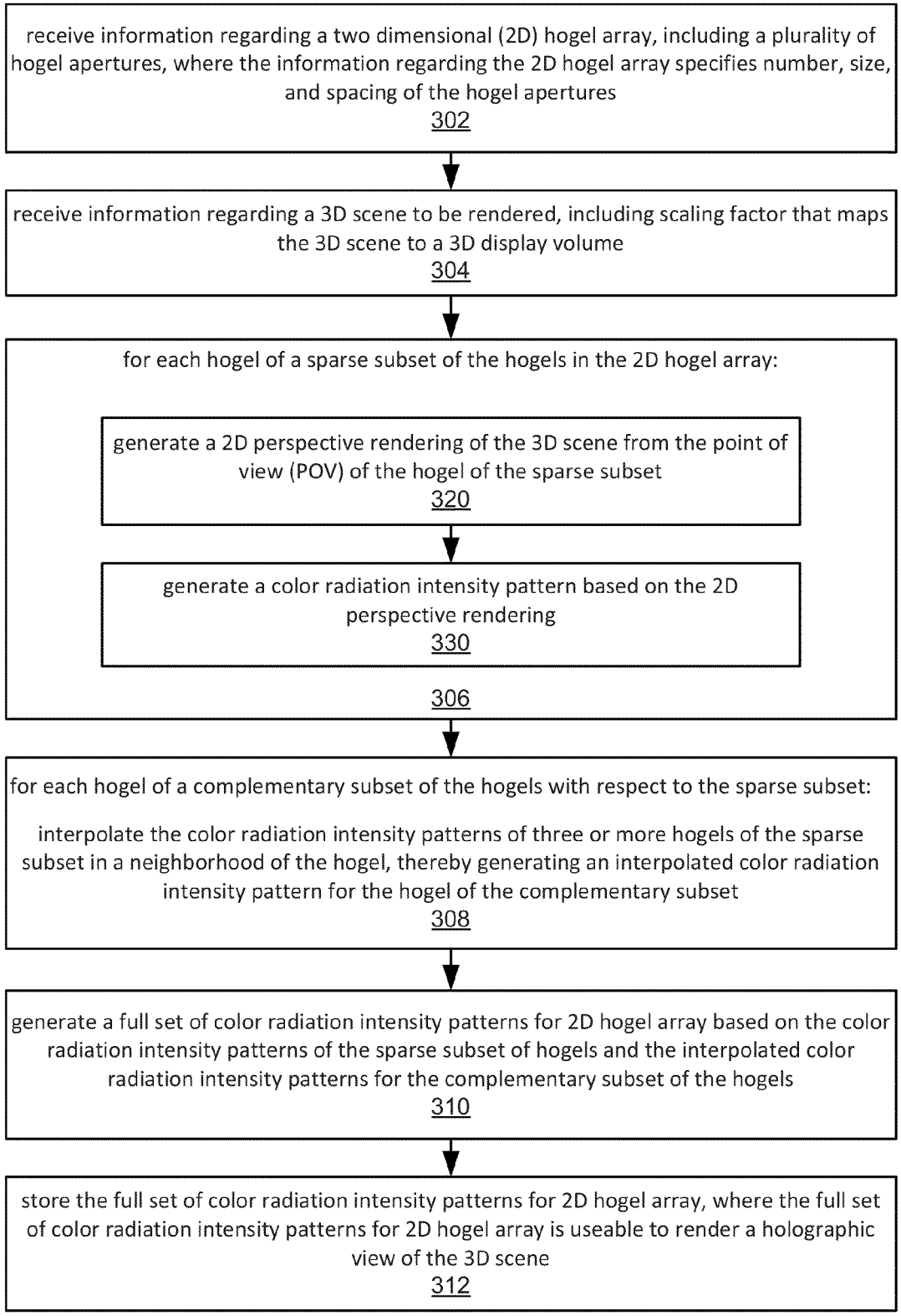
FIG. 3 is a flowchart of a method for video holographic rendering of a dynamic 3D scene.

FIG. 3: Flowchart of a Method for Video Holographic Rendering of a Dynamic 3D Scene The full set of color radiation intensity patterns for the 2D hogel array may be useable to render a holographic view of the 3D scene. Moreover, the above method elements may be repeated one or more times in an iterative manner to dynamically render a sequence of such scenes, e.g., to present a holographic video, e.g., in real time.

In some embodiments, the 2D hogel array may be defined on a surface, e.g., a curved, possibly complex, surface, and the information regarding the 2D hogel array may further specify the surface. The method may thus take the shape of the 2D hogel array into account in implementing the techniques disclosed herein.

TABLE 2

Interpolation from correlation approach to hogel rendering at 30 frames per second - hardware architecture comparison by milestone

| Display Size | | based on Nvidia GF110 in GeForce GTX 580 | | based on AMD Cayman in Radeon HD 6970 | | based on CLX hx3100a in hxHADS | |
| --- | --- | --- | --- | --- | --- | --- | --- |
| (hogels) (approximate) | op/sec at 30 fps | # of Nvidia GF110's | W | # of AMD Cayman's | W | # of CLX hx3100a's | W |
| 144 | 1.2E10 | 1 | 149 | 1 | 135 | 1 | 2 |
| 2400 | 1.9E11 | 1 | 267 | 1 | 184 | 3 | 12 |
| 10,000 | 7.6E11 | 2 | 787 | 1 | 472 | 10 | 47 |
| 600,000 | 4.9E13 | 120 | 4.9E4 | 59 | 2.1E4 | 605 | 3.0E3 |

FIG. 3 is a flowchart of a method for video holographic rendering of a dynamic 3D scene. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, information regarding a two dimensional (2D) hogel array (i.e., an array of hogels) that includes a plurality of hogel apertures may be received. The information regarding the 2D hogel array may specify number, size, and/or spacing of the hogel apertures.

In 304, information regarding a 3D scene to be rendered, including a scaling factor that maps the 3D scene to a 3D display volume, may also be received. In other words, the size of the 3D scene may be mapped to the size of the 3D display volume.

As indicated in 306, for each hogel of a sparse subset of the hogels in the 2D hogel array, a 2D perspective rendering of the 3D scene from the point of view (POV) of the hogel of the sparse subset, per 320, and a color radiation intensity pattern may be generated based on the 2D perspective rendering, per 330.

In 308, for each hogel of a complementary subset of the hogels with respect to the sparse subset, the color radiation intensity patterns of three or more hogels of the sparse subset in a neighborhood of the hogel may be generated, thereby generating an interpolated color radiation intensity pattern for the hogel of the complementary subset.

In 310, a full set of color radiation intensity patterns for the 2D hogel array may be generated based on the color radiation intensity patterns of the sparse subset of hogels and the interpolated color radiation intensity patterns for the complementary subset of the hogels.

In 312, the full set of color radiation intensity patterns for the 2D hogel array may be stored, e.g., in a memory medium.

Table 2 illustrates the amount of computation (operations per second) and hardware based on current state-of-art processors to realize the interpolation from correlation rendering approach. The results are based on an approximate 200× factor reduction in computation across all hogels. However, in practice this factor may be expected to vary by scene and distance resolved from screen as discussed above. As may be seen, embodiments of the techniques described herein may substantially reduce the computational loads required to (synthetically) holographically render a dynamic 3D scene.

Although the embodiments above have been described in considerable detail, numerous variations and modifications will become apparent to those skilled in the art once the above disclosure is fully appreciated. It should also be emphasized that the above-described embodiments are only non-limiting examples of implementations. It is intended that the following claims be interpreted to embrace all such variations and modifications.

What is claimed is:

1. A non-transitory computer accessible memory medium that stores program instructions for video holography, wherein the program instructions are executable by at least one processor to implement: receiving information regarding a two dimensional (2D) hogel array, comprising a plurality of hogel apertures, wherein the information regarding the 2D hogel array specifies number, size, and spacing of the hogel apertures;

receiving information regarding a 3D scene to be rendered, including a scaling factor that maps the 3D scene to a 3D display volume;

for each hogel of a sparse subset of the hogels in the 2D hogel array:

computing a 2D perspective rendering of the 3D scene from the point of view (POV) of the hogel of the sparse subset;

computing a color radiation intensity pattern based on the 2D perspective rendering;

for each hogel of a complementary subset of the hogels with respect to the sparse subset:

interpolating the color radiation intensity patterns of three or more hogels of the sparse subset in a neighborhood of the hogel, thereby generating an interpolated color radiation intensity pattern for the hogel of the complementary subset;

computing a full set of color radiation intensity patterns for the 2D hogel array based on the color radiation intensity patterns of the sparse subset of hogels and the interpolated color radiation intensity patterns for the complementary subset of the hogels; and storing the full set of color radiation intensity patterns for the 2D hogel array, wherein the full set of color radiation intensity patterns for the 2D hogel array is useable to render a video holographic view of the 3D scene on a video display device.

2. The non-transitory computer accessible memory medium of claim 1, wherein the 2D hogel array is defined on a surface, and wherein the information regarding the 2D hogel array further specifies the surface.

3. A system for video holographic display, comprising:

at least one processor;

a memory, coupled to the at least one processor, wherein the memory stores program instructions executable by the at least one processor to: receive information regarding a two dimensional (2D) hogel array, comprising a plurality of hogel apertures, wherein the information regarding the 2D hogel array specifies number, size, and spacing of the hogel apertures;

receive information regarding a 3D scene to be rendered, including a scaling factor that maps the 3D scene to a 3D display volume;

for each hogel of a sparse subset of the hogels in the 2D hogel array:

compute a 2D perspective rendering of the 3D scene from the point of view (POV) of the hogel of the sparse subset;

compute a color radiation intensity pattern based on the 2D perspective rendering;

for each hogel of a complementary subset of the hogels with respect to the sparse subset:

interpolate the color radiation intensity patterns of three or more hogels of the sparse subset in a neighborhood of the hogel, thereby generating an interpolated color radiation intensity pattern for the hogel of the complementary subset;

compute a full set of color radiation intensity patterns for the 2D hogel array based on the color radiation intensity patterns of the sparse subset of hogels and the interpolated color radiation intensity patterns for the complementary subset of the hogels; and store the full set of color radiation intensity patterns for the 2D hogel array, wherein the full set of color radiation intensity patterns for the 2D hogel array is useable to render a video holographic view of the 3D scene on a video display device.

4. The system of claim 1, wherein the 2D hogel array is defined on a surface, and wherein the information regarding the 2D hogel array further specifies the surface.

* * * * *